(12) United States Patent
Watanabe et al.

(10) Patent No.: US 6,623,885 B1
(45) Date of Patent: Sep. 23, 2003

(54) POWER SOURCE ELEMENT HAVING CONNECTING TERMINALS

(75) Inventors: Shunji Watanabe, Chiba (JP);
Nobuyoshi Takahashi, Chiba (JP);
Hideharu Onodera, Chiba (JP); Tsugio Sakai, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/502,707

(22) Filed: Feb. 11, 2000

(30) Foreign Application Priority Data

Feb. 16, 1999 (JP) .............................................. 11-37246

(51) Int. Cl.[7] .............................. H01M 2/30; H01M 2/26

(52) U.S. Cl. ....................... 429/178; 429/164; 439/475

(58) Field of Search ................................ 429/178, 174,
429/168, 166, 164; 439/475

(56) References Cited

U.S. PATENT DOCUMENTS

| | | | | |
|---|---|---|---|---|
| 5,098,802 A | * | 3/1992 | Kainoh | 429/178 |
| 5,116,700 A | * | 5/1992 | Takeda | 429/178 X |
| 5,987,337 A | * | 11/1999 | Takaya | 429/178 X |
| 6,114,060 A | * | 9/2000 | Tuttle | 429/178 X |

* cited by examiner

*Primary Examiner*—John S. Maples
(74) *Attorney, Agent, or Firm*—Adams & Wilks

(57) ABSTRACT

A power source element has a positive electrode case, a negative electrode case, and a pair of connecting terminals, each having a first end portion connected to a respective one of the positive and negative electrode cases, a second end portion for connection to a circuit board, and an intermediate portion disposed between the first and second end portions. The intermediate portion of each of the connecting terminals has a weakened region so that the first end portion is separated from the second end portion along a weakened line in the weakened region upon relative movement between the first and second end portions in a give direction.

37 Claims, 5 Drawing Sheets

POWER SOURCE ELEMENT HAVING CONNECTING TERMINALS

BACKGROUND OF THE INVENTION

The present invention relates to a power source element, such as a battery or an electric double layer capacitor, having connecting terminals or terminal leads bonded to positive and negative electrode cases thereof.

As the development of electronic appliances advances, batteries or electric double layer capacitors with terminal leads welded to the positive and negative electrodes of the cases thereof are being broadly used in electronic circuit boards with the above terminal leads soldered thereon. Above all, button type lithium batteries, lithium ion secondary batteries and electric double layer capacitors have been widely utilized in applications such as memory backup. The terminal leads have had a thickness of from 0.1 mm to 0.3 mm to provide strength in order to satisfy the requirement for high reliability of battery function retention.

In recent years, as the concerns over environmental problem increase there have been increased demands on the designing stage to facilitate disassembling upon scrapping and reduce the materials to be separated. In the case where a battery or electric double layer capacitor is welded with terminal leads and thereafter soldered onto a board for usage, it is not easy to remove and separate the battery or electric double layer capacitor upon scrapping.

SUMMARY OF THE INVENTION

It is therefore an object of the present invention to provide a power source element, such as a battery or an electric double layer capacitor, with terminal leads which retains high reliability while reducing the burden of environmental considerations when being scrapped.

In accordance with the present invention, there is provided a power source element, such as a battery or an electric double layer capacitor, having terminal leads bonded to the positive electrode case and the negative electrode case thereof, and in which a mechanism (such as a cutting or breakable portion formed along a weakened line) is provided in each of the terminal leads to facilitate cutting, e.g., a thickness-reduced portion, a cut-out notch, perforation-like holes or the like.

DETAILED DESCRIPTION OF THE PREFERRED EMBODIMENTS

It has been a practice to use terminal leads with a strength having a thickness of 0.1 mm to 0.3 mm because of the requirement for high reliability in battery function retention. This however has resulted in the necessity to use some sort of tool for cutting leads when a battery with such leads is separated from the appliance on which it was used to be scrapped.

The invention accordingly provides a thickness-reduced portion, a cut-out notch portion, perforation-like holes or the like in one part of the terminal lead to facilitate cutting. When such means is provided on a strong terminal lead, if a bending, twist or the like is applied to the terminal lead when the battery with the terminal lead is separated from the board of the appliance, stresses are concentrated on this place. Thus, the terminal lead can be readily cut at that position.

Where a force is applied in the thickness direction of a terminal lead to be cut, it is preferred to provide it with a thickness-reduced portion or perforation-like holes in one part of the terminal lead. On the other head, where a force or twist is applied in the width direction of a terminal lead, it is advantageous to provide a cut-out notch in one part of the terminal lead.

The combined use of a thickness-reduced portion, a cut-out notch and perforation-like holes makes cutting easy. The thickness of the thickness-reduced portion or the degree of the cut-out notch portion may be determined by taking into account the easiness of cutting and reliability in battery function retention.

Also, although the explanation herein is only for a battery, the invention can be applied to an electric double layer capacitor or the like in the same shape.

The present invention will now be described with reference to the drawings. It should be noted that the examples shown hereunder are to embody the technical idea of the invention but not to limit the invention.

EXAMPLE 1

Figure 1:
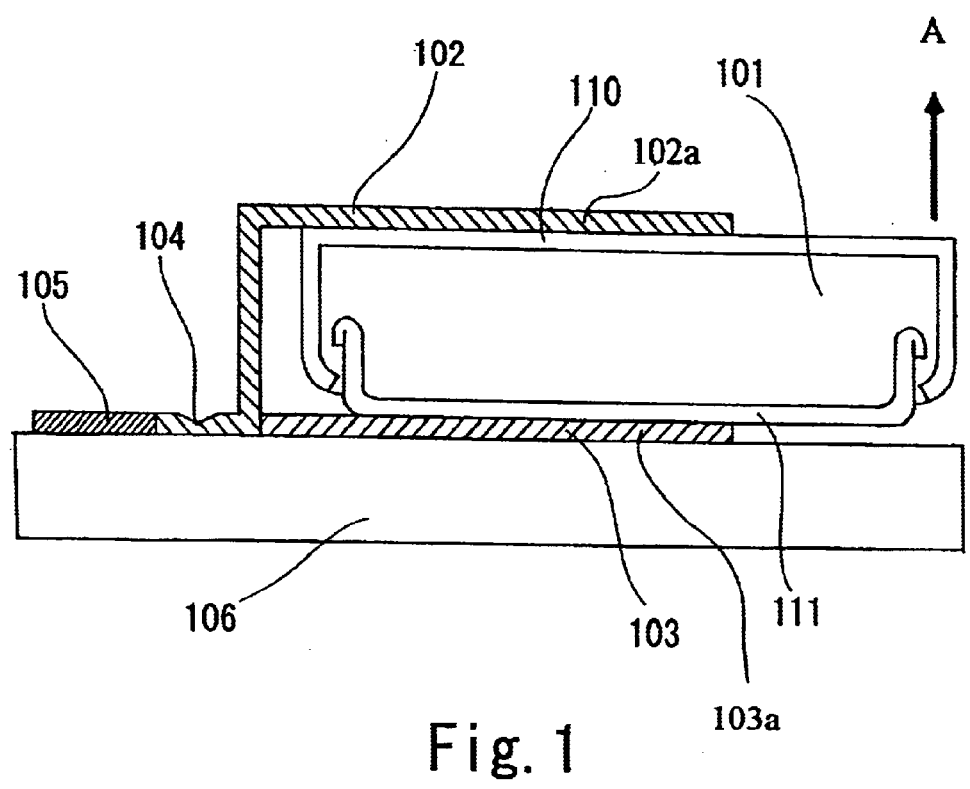
FIG. 1 is a side view of a flat type non-aqueous electrolytic lithium ion secondary battery to which the present invention is applied.
Figure 2:
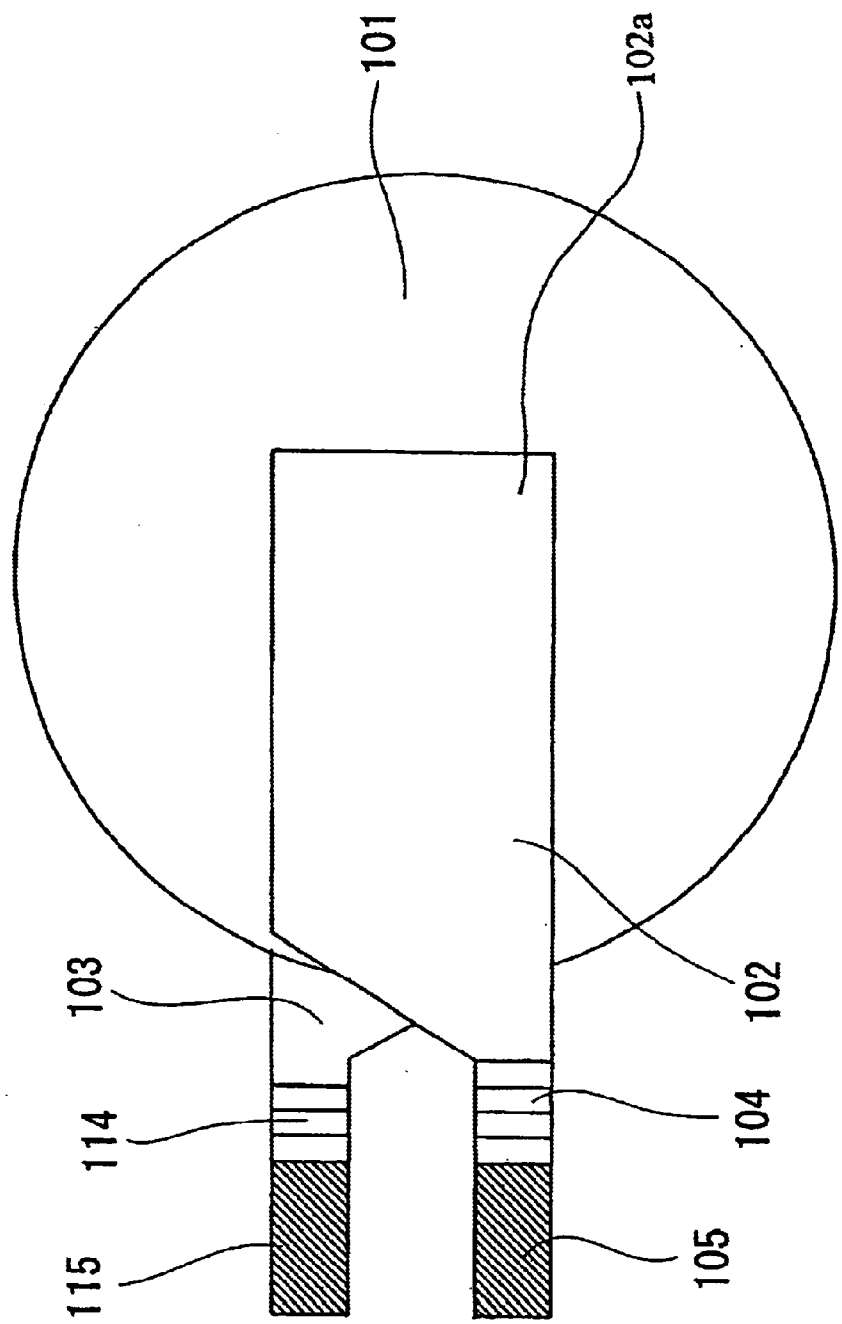
FIG. 2 is an overhead plane view of a flat type non-aqueous electrolytic lithium ion secondary battery of the invention.

FIG. 1 is a side view wherein the invention is applied to a flat type non-aqueous electrolytic lithium ion secondary battery. FIG. 2 is a plane view of the same battery as viewed from above.

To explain the application of the invention to a battery, a one-element battery will be used. The battery is a non-aqueous electrolytic lithium ion secondary battery including a negative electrode lithium ion secondary battery including a negative electrode having silicon oxide as an active material and a positive electrode having lithium manganese oxide as an active material. The battery has a size of 6.8 mm in diameter and 2.0 mm in height. The negative electrode case 111 is made of stainless steel (SUS304) while the positive electrode case 110 is of stainless steel (SUS444). Each case is laser-welded with a negative electrode terminal lead 103 and positive electrode terminal lead 102 that are made of stainless steel (SUS304) with a thickness of 0.15 mm. As shown in FIG. 1, each terminal is provided with respective first end portions 102a, 103a and thickness-reduced portions 104 and 114 having a thickness of about 0.1 mm. The battery 101 with its terminal leads was fixed onto a circuit board 106 by soldering second end portion 105, 115. When a force was applied to the battery in the force applying direction A as shown FIG. 1, it was confirmed that bending easily occurred at the thickness-reduced portion 104 and 114, and several such vertical movements easily accomplished cutting off of the battery portion. Thus the thickness-reduced portions 104, 114 define weakened lines along which the battery portion can be separated from the soldering portions.

EXAMPLE 2

Figure 3:
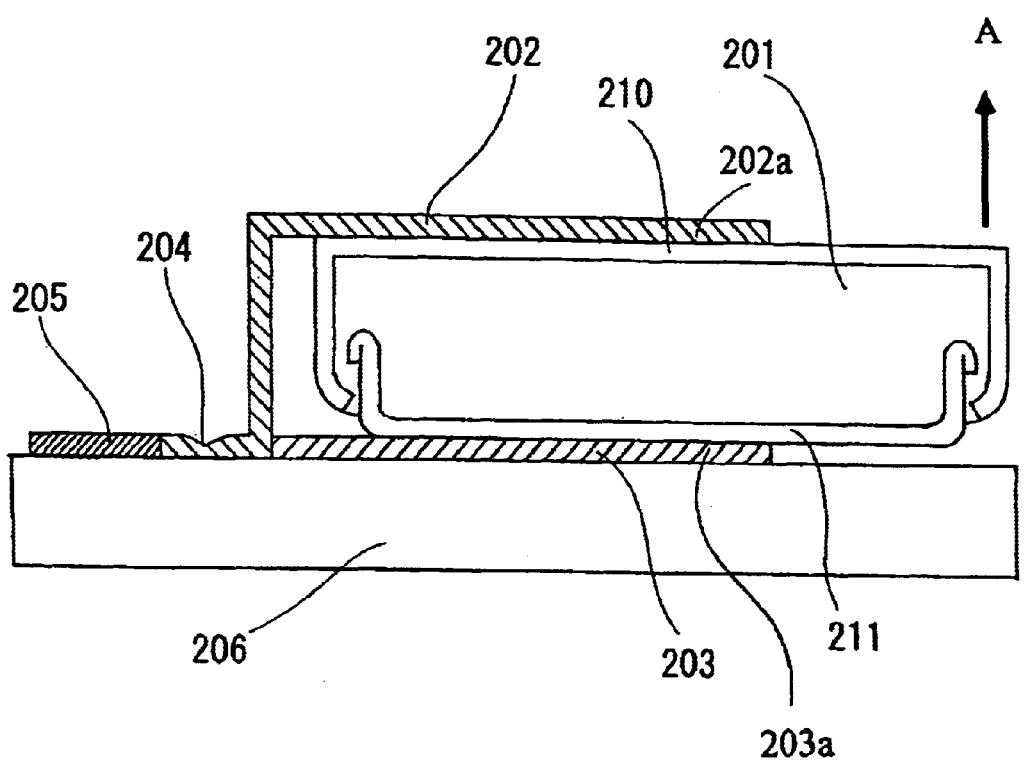
FIG. 3 is a side view of a flat type electric double layer capacitor to which the invention is applied.
Figure 4:
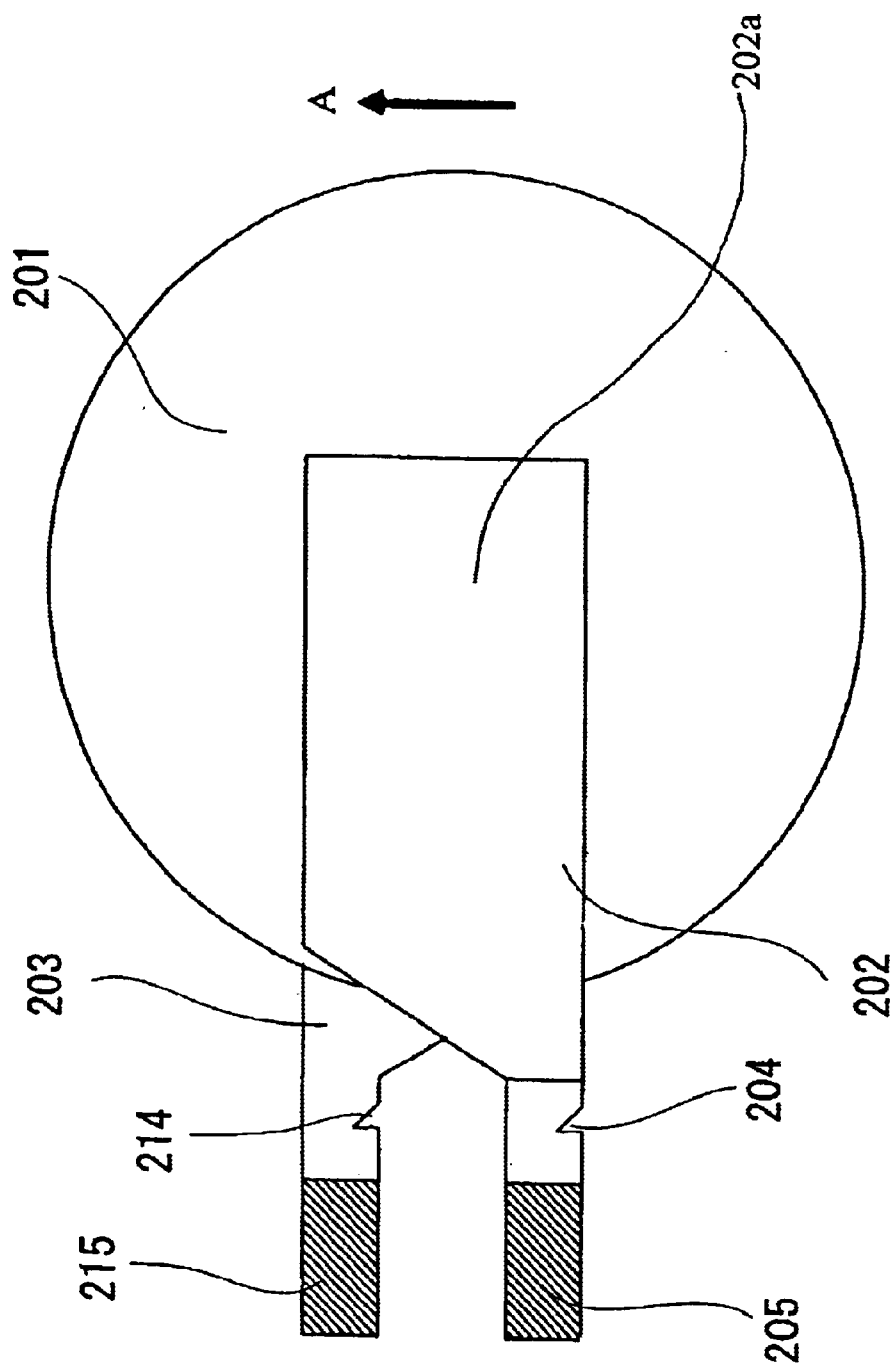
FIG. 4 is overhead plane view of the flat type electric double layer capacitor of the invention.

FIG. 3 is a side view where the invention is applied to a flat type electric double layer capacitor. FIG. 4 is a plan view of the capacitor as viewed from above.

Explained is an electric double layer capacitor to which the invention is applied. This capacitor is an electric double layer capacitor including activated carbon as a polarizing active material and a non-aqueous solvent as an electrolytic solution. The capacitor has a size of 6.8 mm in diameter and 2.1 mm in height, the same as that of Example 1. A negative electrode case 211 is made of stainless steel (SUS304) while a positive electrode case 210 is of stainless steel (SUS444). Each case is laser-welded with a negative electrode terminal lead 203 and positive electrode terminal lead 202 that are made of stainless steel (SUS304) with a thickness of 0.15 mm. As shown in FIG. 3 and 4, each terminal is provided with respective first end portions 202a, 203a and cut-out notch portions 204 and 214. This electric double layer capacitor 201 with its terminal leads was fixed onto a circuit board 206 by soldering second end portions 205, 215. A force applied to this electric double layer capacitor in the force applying direction A as shown FIG. 3, it could be confirmed that cracking easily occurred by the cut-out notch portion 204 and 214, and cutting off of the capacitor was easily done by several such vertical movements.

EXAMPLE 3

Figure 5:
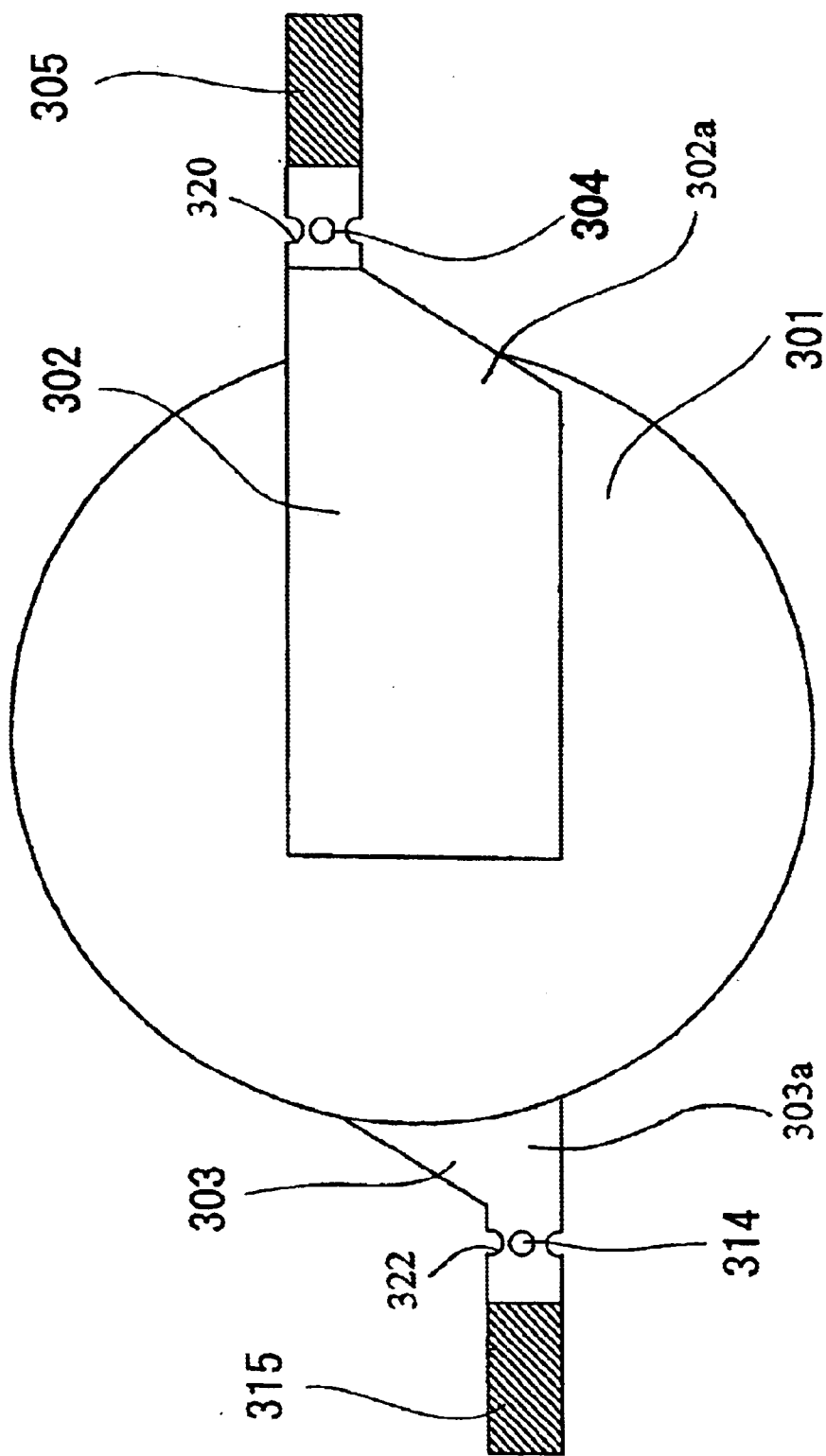
FIG. 5 is a plane view as viewed from above of a flat type non-aqueous electrolytic lithium ion secondary battery to which the invention is applied.

FIG. 5 is a plane view, as viewed from above, where the invention is applied to a flat type non-aqueous electrolytic lithium ion secondary battery.

The same battery as in Example 1 is used, a one-element battery 301, to which the invention is applied. The case is laser-welded with a negative electrode terminal lead 303 and a positive electrode terminal lead 302 that are made of stainless steel (SUS304) with a thickness of 0.15 mm. As shown in FIG. 5, each terminal is provided with respective first end portions 302a, 303a, perforation-like holes 304 and 314 and notch portions 320, 322. While not shown in the embodiment of FIG. 5, it will be appreciated-by those skilled in the art that the first end portion 303a corresponds to the negative electrode terminal lead 303 and is disposed on a surface of the battery 301 opposite a surface thereof on which the first end portion 302a is disposed. The battery 301 with its terminal leads was fixed onto a circuit board 106 by soldering second end portions 305, 315. A force was applied to the battery so as to cause twisting in the area of the perforation-like holes 304 and 314 and notch portions 320, 322. The terminal lead could be torn off by repeating such movements several times. The shape and number of holes and notches are not particularly limited. The shape may be, besides circular, oval, square, rhombic or the like. The number and size of the holes and notches may be determined by taking into account the force to be applied for cutting.

The invention is therefore directed to a power source element with terminal leads wherein the terminal leads are bonded to positive and negative electrode terminals, and in which a mechanism is provided in each of the terminal leads to facilitate cutting, e.g. a thickness-reduced portion, a cut-out notch, perforation-like holes or the like. Due to this, the power source element, such as a battery or an electric double layer capacitor, is easily cut away when scrapping the appliance within which the power source element is incorporated, thereby facilitating scrapping that includes separation by category of material and hence reducing environmental burden cause by scrapping.

What is claimed is:

1. A power source element comprising: a positive electrode case; a negative electrode case; a first connecting terminal having a first end portion connected to the positive electrode case and a second end portion; a second connecting terminal having a first end portion connected to the negative electrode case and a second end portion; and means defining a weakened region formed in each of the first and second connecting terminals and interconnecting the first and second end portions thereof to enable separation of the first and second end portions from one another upon application of a preselected force to the power source element in a given direction.

2. A power source element according to claim 1; wherein the power source element comprises a battery.

3. A power source element according to claim 1; wherein the means defining the weakened region comprises a portion of each of the first and second connecting terminals having a thickness smaller than that of the first and second end portions.

4. A power source element according to claim 1; wherein the means defining the weakened region comprises a notched portion.

5. A power source element according to claim 1; wherein the means defining the weakened region comprises at least one perforation.

6. A power source element according to claim 5; wherein the at least one perforation comprises a plurality of perforations.

7. A power source element according to claim 6; wherein the perforations are disposed along a line of separation between the first and second end portions.

8. A power source element according to claim 1; wherein the means defining the weakened region comprises a notched portion disposed along a line of separation between the first and second end portions.

9. A power source element according to claim 1; wherein the means defining the weakened region comprises a notched portion formed in a side edge of each of the first and second connecting terminals.

10. A power source element according to claim 9; wherein the notched portion is generally V-shaped.

11. A power source element according to claim 1; wherein the means defining the weakened region comprises a pair of notched portions each formed in a respective side edge of each of the first and second connecting terminals and a perforation disposed between the notched portions.

12. A power source element according to claim 11; wherein the notched portions are generally semicircular-shaped.

13. A power source element according to claim 1; wherein the first end portion of the first connecting terminal is welded to the positive electrode case; and wherein the first end portion of the second connecting terminal is welded to the negative electrode case.

14. A power source element according to claim 13, wherein the first end portion of the first connecting terminal is laser-welded to the positive electrode case; and wherein the first end portion of the second connecting terminal is laser-welded to the negative electrode case.

15. A power source element comprising: a positive electrode case; a negative electrode case; a pair of connecting terminals each having a first end portion connected to a respective one of the positive and negative electrode cases, a second end portion for connection to a circuit board, and an intermediate portion disposed between the first and second end portions; and means defining a weakened region formed in the intermediate portion of each of the connecting terminals to enable separation of the first end portion from the second end portion of each of the connecting terminals along a weakened line in the weakened region upon relative movement between the first and second end portions in a given direction.

16. A power source element according to claim 15; wherein the means defining the weakened region comprises a portion of each of the first and second connecting terminals having a thickness smaller than that of the first and second end portions.

17. A power source element according to claim 15; wherein the means defining the weakened region comprises a notch formed in the intermediate portion and extending along the weakened line.

18. A power source element according to claim 15; wherein the means defining the weakened region comprises at least one perforation formed in the intermediate portion.

19. A power source element according to claim 18; wherein the at least one perforation comprises a plurality of perforations.

20. A power source element according to claim 19; wherein the perforations are disposed along the weakened line.

21. A power source element according to claim 15; wherein the means defining the weakened region comprises a notched portion formed in a side edge of the intermediate portion of each of the first and second connecting terminals.

22. A power source element according to claim 21; wherein the notched portion is generally V-shaped.

23. A power source element according to claim 15; wherein the means defining the weakened region comprises a pair of notched portions each formed in a respective side edge of the intermediate portion of each of the first and second connecting terminals and a perforation disposed between the notched portions.

24. A power source element according to claim 23; wherein the notched portions are generally semicircular-shaped.

25. A power source element according to claim 15; wherein the first end portion of the first connecting terminal is welded to the positive electrode case; and wherein the first end portion of the second connecting terminal is welded to the negative electrode case.

26. A power source element according to claim 25; wherein the first end portion of the first connecting terminal is laser-welded to the positive electrode case; and wherein the first end portion of the second connecting terminal is laser-welded to the negative electrode case.

27. A power source element comprising: a positive electrode case; a negative electrode case; a first connecting terminal extending radially from the positive electrode in a first direction, the first connecting terminal having a base portion connected to the positive electrode case and a front end portion; a second connecting terminal extending radially from the negative electrode in a second direction opposite the first direction, the second connecting terminal having a base portion connected to the negative electrode case and a front end portion; and means defining a weakened region formed in each of the first and second connecting terminals to enable separation of each of the base portions from a respective one of the front end portions of the first and second connecting terminals upon relative movement between the front end portions and the base portions in a given direction.

28. A power source element according to claim 27; wherein the means defining the weakened region comprises an intermediate portion disposed between the base portion and the front end portion and having a thickness smaller than that of the base portion and the front end portion.

29. A power source element according to claim 27; wherein the means defining the weakened region comprises a notched portion disposed between the base portion and the front end portion.

30. A power source element according to claim 27; wherein the means defining the weakened region comprises at least one perforation disposed between the base portion and the front end portion.

31. A power source element according to claim 30; wherein the at least one perforation comprises a plurality of perforations.

32. A power source element according to claim 31; wherein the perforations are disposed along a line of separation between the base portion and the front end portion.

33. A power source element according to claim 27; wherein the means defining the weakened region comprises a notched portion disposed along a line of separation between the base portion and the front end portion.

34. A power source element according to claim 27; wherein the means defining the weakened region comprises a notched portion formed in a side edge of each of the first and second connecting terminals.

35. A power source element according to claim 34; wherein the notched portion is generally V-shaped.

36. A power source element according to claim 27; wherein the means defining the weakened region comprises a pair of notched portions each formed in a respective side edge of each of the first and second connecting terminals and a perforation disposed between the notched portions.

37. A power source element according to claim 36; wherein the notched portions are generally semicircular-shaped.

* * * * *